United States Patent

Kondo et al.

Patent Number: 6,014,174
Date of Patent: *Jan. 11, 2000

[54] PICTURE ENCODING APPARATUS, PICTURE ENCODING METHOD, PICTURE ENCODING AND TRANSMITTING METHOD, AND PICTURE RECORD MEDIUM

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[*] Notice: This patent is subject to a terminal disclaimer.

[21] Appl. No.: 08/932,712

[22] Filed: Sep. 17, 1997

Related U.S. Application Data

[63] Continuation of application No. 08/671,783, Jun. 20, 1996, Pat. No. 5,734,433.

[30] Foreign Application Priority Data

Jun. 21, 1995 [JP] Japan ................................. 7-178244

[51] Int. Cl.[7] ...................................................... H04N 7/32
[52] U.S. Cl. .......................................... 348/421; 348/420
[58] Field of Search ..................................... 348/421, 420, 348/405, 406, 402, 407, 413, 416; 382/239, 247; 364/153; 386/27, 33, 109, 111–112; H04N 7/32

[56] References Cited

U.S. PATENT DOCUMENTS

| | | | |
|---|---|---|---|
| 4,703,352 | 10/1987 | Kondo ...................................... | 348/421 |
| 4,772,947 | 9/1988 | Kono ...................................... | 348/420 |
| 5,049,990 | 9/1991 | Kondo et al. ........................... | 348/421 |
| 5,150,208 | 9/1992 | Otaka et al. ............................. | 348/421 |
| 5,193,003 | 3/1993 | Kondo ..................................... | 348/420 |
| 5,196,931 | 3/1993 | Kondo ..................................... | 348/420 |
| 5,416,604 | 5/1995 | Park ......................................... | 348/384 |
| 5,444,487 | 8/1995 | Kondo et al. ........................... | 348/405 |
| 5,481,554 | 1/1996 | Kondo ....................................... | 371/53 |
| 5,528,606 | 6/1996 | Kondo et al. .......................... | 371/37.4 |
| 5,612,751 | 3/1997 | Kondo ..................................... | 348/416 |
| 5,627,905 | 5/1997 | Sebok et al. ............................ | 348/416 |
| 5,734,433 | 3/1998 | Kondo et al. ........................... | 348/421 |

Primary Examiner—Vu Le
Attorney, Agent, or Firm—Frommer Lawrence & Haug, LLP.

[57] ABSTRACT

On a decoding side, parameters (minimum value MIN and dynamic range DR) are optimized in such a manner that a decoded error of original signal values and restored values becomes minimum. A maximum value detecting portion 2 detects the maximum value MAX of pixels of each block composed of (3×3) pixels. Likewise, a minimum value detecting portion 3 detects the minimum value MIN. A subtracting portion 4 generates a dynamic range DR. A subtracting portion 5 subtracts MIN from each of input pixel values y and generates normalized values. A step width calculating portion 6 calculates a quantizing step width $\Delta$ with DR. A quantizing portion 7 generates quantized values x (each of which is composed of 4 bits) with $\Delta$. A least squares method based estimating portion 8 generates decoded values y' with y and x and obtains an optimized dynamic range DR' and an optimized minimum value MIN' in such a manner that the sum of square of an error (y'−y) becomes minimum. A framing portion 11 frames x, DR', and MIN' and records the framed data on a record medium 15 through an error-correction-code adding portion 12, a modulating portion 13, and a recording portion 14.

3 Claims, 10 Drawing Sheets

PICTURE ENCODING APPARATUS, PICTURE ENCODING METHOD, PICTURE ENCODING AND TRANSMITTING METHOD, AND PICTURE RECORD MEDIUM

This application is a continuation of application Ser. No. 08/671,783, filed Jun. 20, 1996, now U.S. Pat. No. 5,734,433.

BACKGROUND OF THE INVENTION

1. Field of the Invention

The present invention relates to a picture encoding apparatus for encoding a digital picture signal in such a manner that the data amount thereof is reduced, a picture encoding method thereof, a picture encoding and transmitting method thereof, and a picture record medium thereof. In particular, the present invention relates to a picture encoding apparatus for encoding a digital picture signal and transmitting additional information along with the encoded information, a picture encoding method thereof, a picture encoding and transmitting method thereof, and a picture record medium thereof.

2. Description of Related Art

Figure 1:
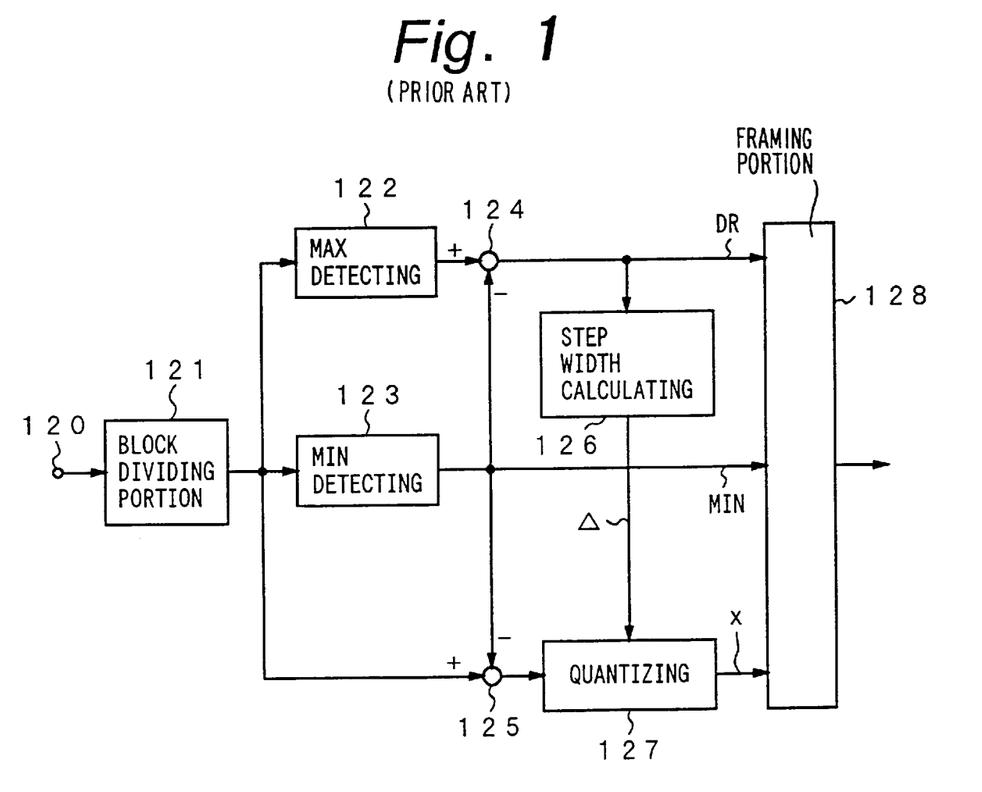
FIG. 1 is a block diagram showing a conventional ADRC system.

FIG. 1 is a block diagram showing a structure of a picture encoding apparatus that compresses a digital picture signal. The picture encoding apparatus shown in FIG. 1 is an encoding apparatus corresponding to the ADRC (Adaptive Dynamic Range Coding) method. The encoding apparatus divides the input picture signal into blocks and adaptively encodes pixels of each block corresponding to the dynamic range of the block.

The ADRC method has been proposed by the applicant of the present patent application as U.S. Pat. No. 4,703,352 issued on Oct. 27, 1987 (corresponding to Japanese Patent Laid-Open Publication No. 61-14498 laid open on Jul. 2, 1986). Next, with reference to FIG. 1, the ADRC method will be described in brief. An input picture signal is supplied form an input terminal 120 to a block dividing portion 121. The block dividing portion 121 divides the input picture signal into blocks each of which is composed of for example 9 pixels (3 pixels×3 lines) (hereinafter referred to as a block of (3×3) pixels). The output signal for each block is supplied from the block dividing portion 121 to a maximum value detecting portion 122 and a minimum value detecting portion 123.

The maximum value detecting portion 122 detects the maximum value MAX of the pixel values of the block. The minimum value detecting portion 123 detects the minimum value MIN of the pixel values of the block. The maximum value MAX is supplied from the maximum value detecting portion 122 to a subtracting portion 124. On the other hand, the minimum value MIN is supplied from the minimum value detecting portion 123 to the subtracting portion 124, a subtracting portion 125, and a framing portion 128.

The subtracting portion 124 subtracts the minimum value MIN from the maximum value MAX and generates a dynamic range DR. The dynamic range DR is supplied to a quantizing step width calculating portion 126 and the framing portion 128. The quantizing step width calculating portion 126 calculates a quantizing step width Δ with the dynamic range DR supplied from the subtracting portion 124 and supplies the calculated quantizing step width Δ to a quantizing portion 127.

The block dividing portion 121 also supplies 9 pixels of the block of (3×3) pixels to the subtracting portion 125. The subtracting portion 125 subtracts the minimum value MIN from each of the 9 pixel values. Thus, each pixel value is normalized. Each normalized pixel value is supplied to the quantizing portion 127. The quantizing portion 127 quantizes the normalized pixel values with the quantizing step width Δ and supplies quantized values x to the framing portion 128.

The framing portion 128 frames the dynamic range DR and the minimum value MIN supplied as parameters for each block and the quantized values x of the 9 pixels of the block and obtains an output signal. The output signal is recorded on a record medium such as a disc or transmitted through a transmission line.

However, in the case that the quantized values of the block are decoded with the parameters on the recording side, to minimize a decoded error between original signal values and restored values, it is not assured that quantized values of the block are optimally decoded with parameters of a block that have been initially obtained. Occasionally, the decoded error becomes large and thereby the decoded picture may deteriorate.

OBJECT AND SUMMARY OF THE INVENTION

Therefore, an object of the present invention is to provide a picture encoding apparatus for optimizing parameters that have been initially obtained on the encoding side (the parameters are for example the maximum value MAX, the minimum value MIN, or the dynamic range DR in the case of the ADRC method) so as to decrease the decoded error between original signal values and restored values, a picture encoding method thereof, a picture encoding and transmitting method thereof, and a picture record medium thereof.

To accomplish the above-described object, a first aspect of the present invention is a picture encoding method for encoding an input digital picture signal in such a manner that the amount of generated data of the input digital picture signal is reduced, comprising the steps of dividing the input digital picture signal into blocks each of which is composed of a plurality of pixels, encoding the pixels of each of the blocks and generating encoded data and a parameter, and optimizing the parameter generated for each of the blocks in such a manner that the sum of square of an decoded error of the encoded data becomes minimum, a picture encoding apparatus thereof, a picture encoding and transmitting method thereof, and a record medium thereof.

A second aspect of the present invention is the picture encoding method of the first aspect, wherein encoding step comprises the steps of detecting the maximum value of the pixels of each of the blocks and the minimum values thereof, detecting a dynamic range that is the difference between the maximum value and the minimum value, and quantizing pixel values of the pixels that have been normalized with the value of the dynamic range and generating quantized values of the pixels, and wherein the optimizing step is performed by optimizing the parameter of each of the blocks in such a manner that the sum of square of the decoded error of the quantized values becomes minimum, a picture encoding apparatus thereof, a picture encoding and transmitting method thereof, and a record medium thereof.

A third aspect of the present invention is the picture encoding method of the first aspect, wherein the optimizing step is performed by optimizing at least two of information representing the maximum value, the minimum value, and the dynamic range of the pixels of each of the blocks in such a manner that the sum of square of the decoded error of the quantized values becomes minimum, a picture encoding apparatus thereof, a picture encoding and transmitting method thereof, and a record medium thereof.

As described above, according to the present invention, after parameters of a block are obtained, encoded pixel values are decoded with the parameters. The error between the decoded values and the true values is obtained. Thereafter, the parameters are corrected in such a manner that the error becomes minimum. Thus, the error between the original signal values and the restored values can be further decreased.

These and other objects, features and advantages of the present invention will become more apparent in light of the following detailed description of best mode embodiments thereof, as illustrated in the accompanying drawings.

DETAILED DESCRIPTION OF PREFERRED EMBODIMENTS

Figure 2A:
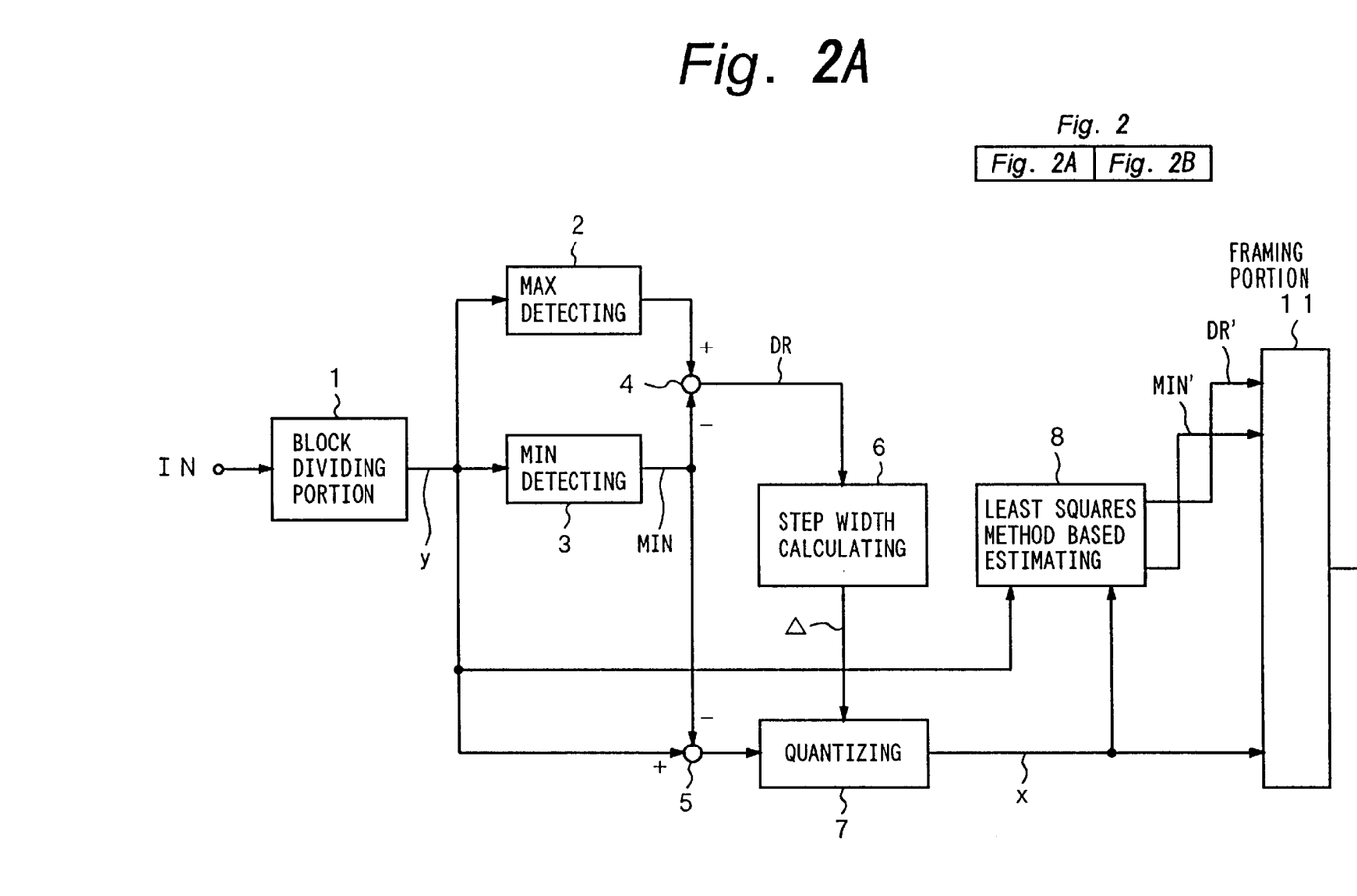
FIGS. 2A and 2B are block diagrams showing a structure of a picture encoding apparatus according to a first embodiment of the present invention.
Figure 2B:
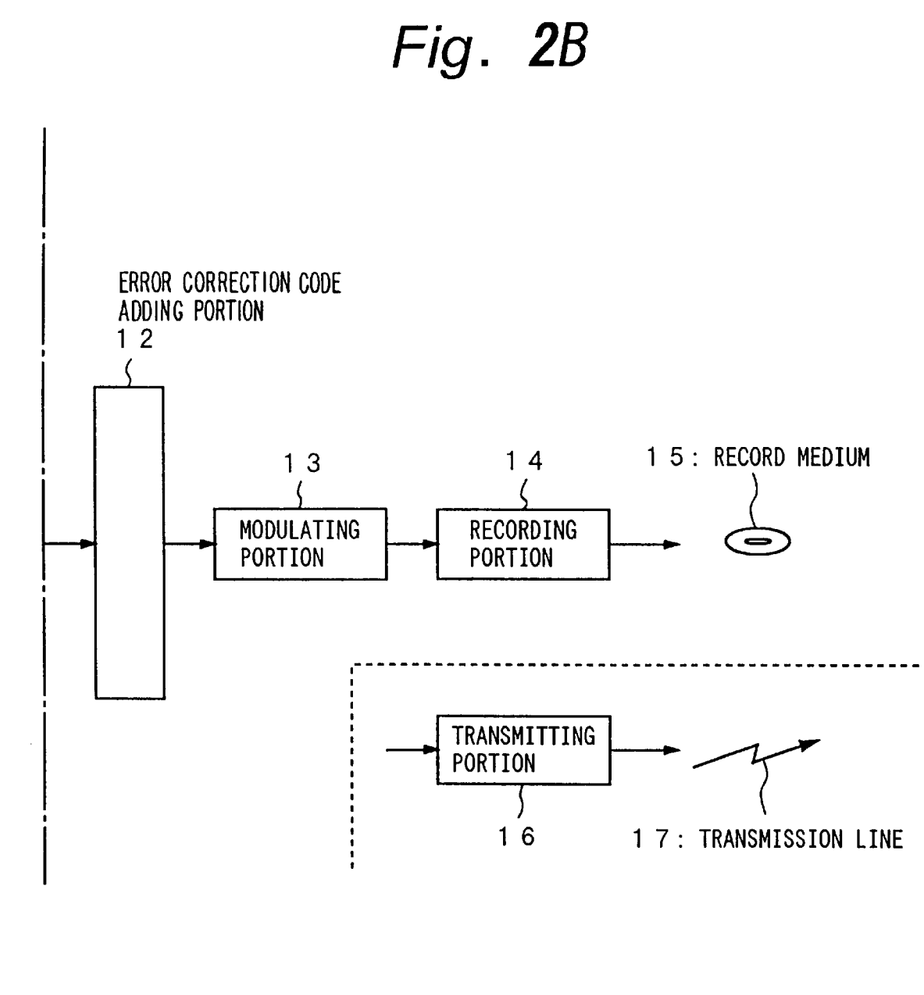

Next, with reference to accompanying drawings, embodiments of the present invention will be described. FIGS. 2A and 2B are block diagrams showing a structure of a picture encoding apparatus according to a first embodiment of the present invention. An input picture signal is supplied from an input terminal IN to a block dividing portion 1. The block dividing portion 1 divides the input picture signal into blocks each of which is composed of (3×3) pixels. Input pixel values y of the 9 pixels of each block of (3×3) pixels are supplied to a maximum value detecting portion 2, a minimum value detecting portion 3, a subtracting portion 5, and a least squares method based estimating portion 8. Each of the input pixel values y is composed of 8 bits.

The maximum value detecting portion 2 detects the maximum value of the levels of the nine pixels of the block of (3×3) pixels and supplies output data as a maximum value MAX to a subtracting portion 4. On the other hand, the minimum value detecting portion 3 detects the minimum value of the levels of the nine pixel values of the block and supplied output data as a minimum value MIN to the subtracting portion 4 and the subtracting portion 5.

The subtracting portion 4 subtracts the minimum value MIN from the maximum value MAX and generates a dynamic range DR. The dynamic range DR is supplied to a quantizing step width calculating portion 6. The subtracting portion 5 subtracts the minimum value MIN from each of the input pixel values y of the 9 pixels of the block of (3×3) pixels and generates normalized pixel values of the 9 pixels of (3×3) pixels. The normalized pixel values are supplied to a quantizing portion 7.

The quantizing step width calculating portion 6 calculates a quantizing step width $\Delta$ with the supplied dynamic range DR and supplies the calculated quantizing step width $\Delta$ to the quantizing portion 7. The quantizing portion 7 quantizes the normalized pixel values of the 9 pixels of the block as four bits and supplies the quantized values x of the 9 pixels of the block of (3×3) pixels to the least squares method based estimating portion 8 and a framing portion 11.

Thus, the input pixel values y of the 9 pixels of the block of (3×3) pixels as the input picture signal and the quantized values x of the 9 pixels of the block of (3×3) pixels are supplied to the least squares method based estimating portion 8. The least squares method based estimating portion 8 estimates an optimized dynamic range DR' and an optimized minimum value MIN' with the input pixel values (true values) y of the block and the quantized values x of the block corresponding to the least squares method in such a manner that the sum of square of an error (y'—y) of the decoded values y' and the true values y becomes minimum. In other words, the following relation is satisfied between the decoded values y' of the input pixel values y and the quantized values x.

$$y' = x \times DR/n + MIN \quad (1)$$

(where n is the number of quantizing bits) The optimized dynamic range DR' can be obtained by the following formula (2).

$$DR' = n \cdot \Delta' \quad (2)$$

(where $\Delta'$ is the optimized quantizing step width)

When the number of pixels of the block is denoted by m, the optimized quantizing step width can be obtained by the following formula (3).

$$\Delta' = (m \cdot \Sigma xy - \Sigma x \cdot \Sigma y)/(m \cdot \Sigma x^2 - (\Sigma x)^2) \quad (3)$$

In addition, the optimized minimum value MIN' can be obtained by the following formula (4).

$$MIN' = (\Sigma y - \Delta' \cdot \Sigma x)/m \quad (4)$$

The optimized dynamic range DR' and the optimized minimum value MIN' are supplied to the framing portion 11. The framing portion 11 frames the quantized values x supplied from the quantizing portion 7, the optimized dynamic range DR' supplied from the least squares method based estimating portion 8, and the optimized minimum value MIN' supplied therefrom and supplies the framed signal to an error correction code adding portion 12.

The error correction code adding portion 12 adds an error correction code to the framed signal and supplies the resultant signal to a modulating portion 13. The modulating portion 13 modulates the resultant signal corresponding to the EFM modulating method or the like. The modulated signal is supplied to a recording portion 14. The recording portion 14 records the modulated signal on a record medium 15 such as a disc.

When the modulated signal is transmitted through a transmission line 17, according to the present invention, a transmitting portion 16 is used instead of the recording portion 14. The modulating portion 13 modulates the framed signal to which the error correction code has been added corresponding to a modulating method suitable for data transmission and supplies the modulated signal to the transmission line 17 through the transmitting portion 16. Since various framing technologies and modulating technologies are known, their description is omitted. In the present invention, any framing technology or any modulating technology can be used.

Figure 3:
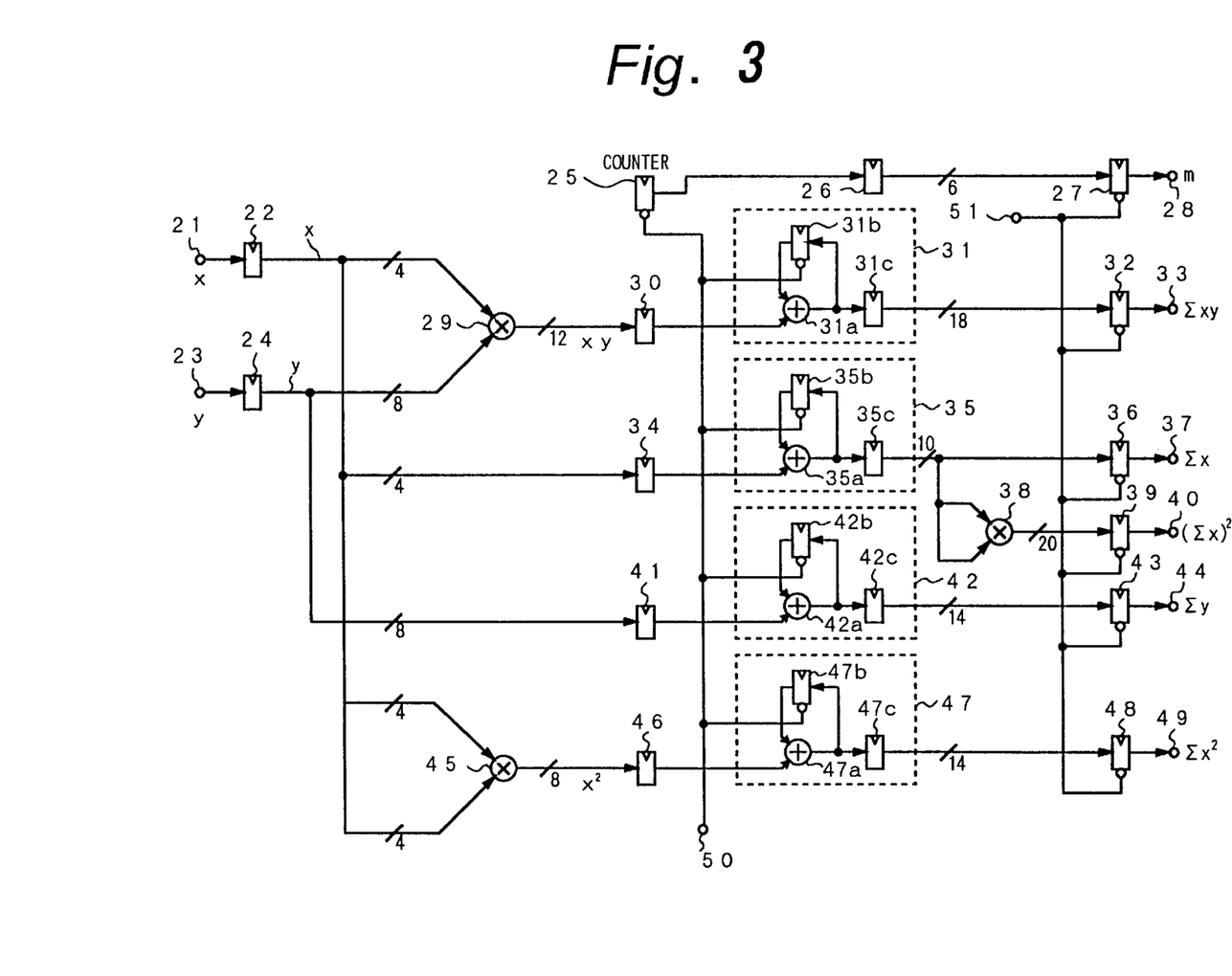
FIG. 3 is a schematic diagram showing a structure of a least squares method based estimating portion according to the present invention.
Figure 4:
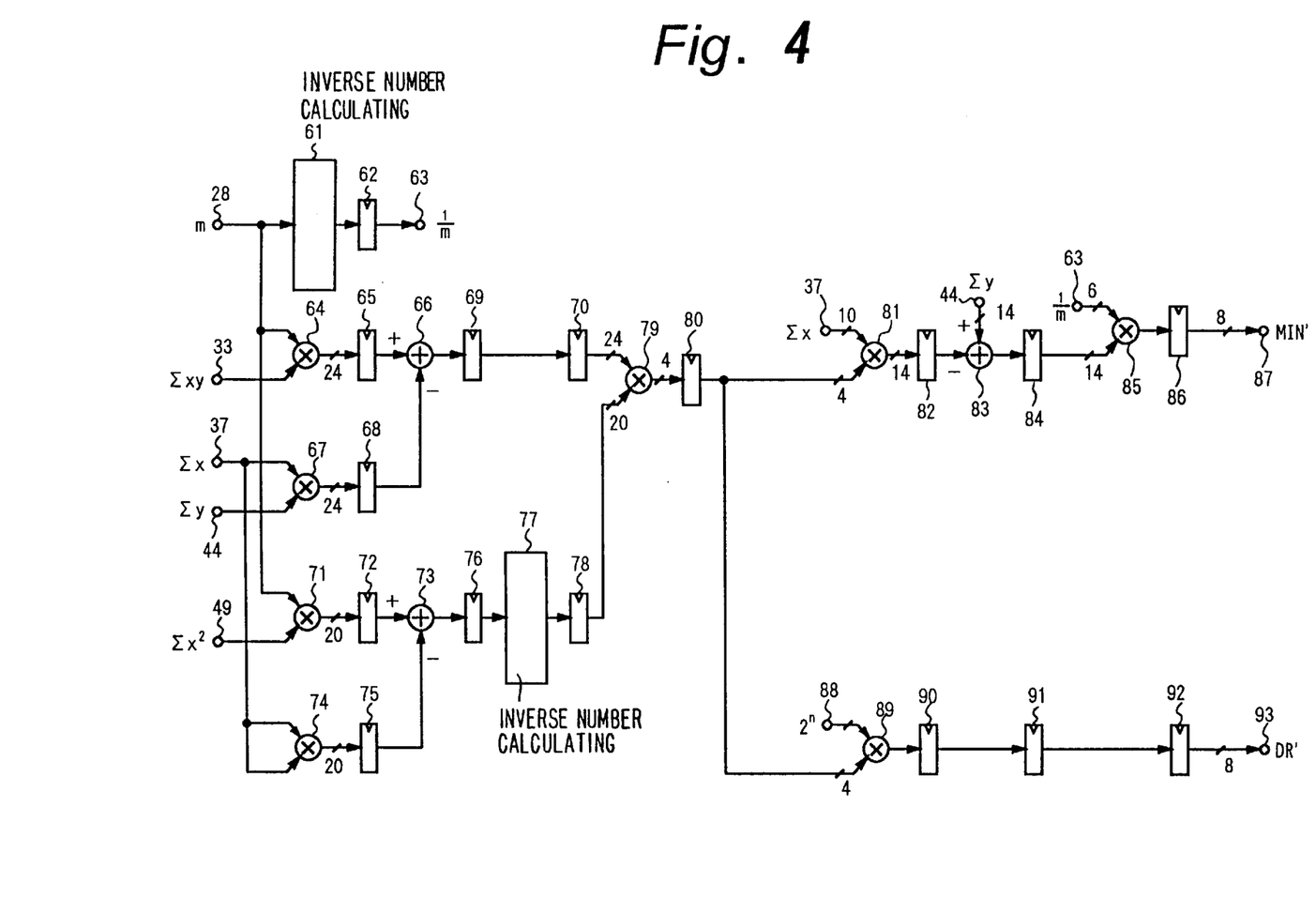
FIG. 4 is a schematic diagram showing a structure of a least squares method based estimating portion according to the present invention.

Next, with reference to FIGS. 3 and 4, the least squares method based estimating portion 8 according to the first embodiment will be described in detail. FIG. 4 is a circuit diagram showing a real structure for obtaining an optimized dynamic range DR' and an optimized minimum value MIN' corresponding to the least squares method. FIG. 3 is a circuit diagram showing a structure for calculating constants necessary for the structure shown in FIG. 4.

As described above, the data x used in the first embodiment is quantized values of pixels, whereas the data y' is the restored values of the data x. In addition, the true values of the data y' are denoted by y and the number of pixels of each block is denoted by m. Thus, the least squares method based estimating portion 8 estimates the optimized minimum value MIN' and the optimized dynamic range DR' with the pixel values y and the quantized values x for each block corresponding to the least squares method in such a manner that the sum of square of the error (y'−y) becomes minimum.

In FIG. 3, data x is supplied from an input terminal 21 to a register 22. Data y is supplied from an input terminal 23 to a register 24. A counter 25 counts the number of pixels of each block corresponding to a clock. The counted number of pixels m is supplied to a terminal 28 through registers 26 and 27.

A multiplying device 29 multiplies the data x (composed of 4 bits) supplied from the register 22 by the data y (composed of 8 bits) supplied from the register 24 and supplies output data (composed of 12 bits) as data xy to an adding circuit 31 through a register 30. In the adding circuit 31, the data xy (composed of 12 bits) is supplied to an adding device 31a. The output data of the adding device 31a is supplied to registers 31b and 31c. The data xy supplied from the register 30 and the output data of the adding device 31a supplied through the register 31b are added by the adding device 31a. The adding circuit 31 supplies output data (composed of 18 bits) as data $\Sigma xy$ to a terminal 33 through a register 32. In other words, the adding circuit 31 generates $\Sigma xy$ for each block.

The data x (composed of 4 bits) supplied from the register 22 is supplied to an adding circuit 35 through a register 34. In the adding circuit 35, the data x (composed of 4 bits) is supplied to an adding device 35a. The output data of the adding device 35a is supplied to registers 35b and 35c. The data x supplied from the register 34 and the output data of the adding device 35a supplied through the register 35b are added by the adding device 35a. The adding circuit 35 supplies output data (composed of 10 bits) as data $\Sigma x$ to a terminal 37 through a register 36. In other words, the adding circuit 35 generates $\Sigma x$ for each block.

In addition, the data $\Sigma x$ (composed of 10 bits) is also supplied from the adding circuit 35 to a multiplying device 38. The multiplying device 38 squares the data $\Sigma x$ and supplies output data (composed of 20 bits) as data $(\Sigma x)^2$ to a terminal 40 through a register 39.

The data y (composed of 8 bits) supplied from the register 24 is supplied to an adding circuit 42 through a register 41. In the adding circuit 42, the supplied data y (composed of 8 bits) is supplied to an adding device 42a. The output data of the adding device 42a is supplied to registers 42b and 42c. The data y supplied from the register 41 and the output data of the adding device 42a supplied through the register 42b are added by the adding device 42a. The adding circuit 42 supplies output data (composed of 14 bits) as data $\Sigma y$ to a terminal 44 through a register 43. In other words, the adding circuit 42 generates $\Sigma y$ for each block.

A multiplying device 45 squares the data x (composed of 4 bits) supplied from the register 22 and supplies output data $x^2$ (composed of 8 bits) to an adding circuit 47a through a register 46. The output data of the adding device 47a is supplied to registers 47b and 47c. The data $x^2$ supplied from the register 46 and the output data of the adding device 47a supplied through the register 47b are added by the adding device 47a. The adding circuit 47 supplies output data (composed of 14 bits) as data $\Sigma x^2$ to a terminal 49 through a register 48. In other words, the adding circuit 47 generates $\Sigma x^2$ for each block.

In addition, an input terminal 50 is connected to the counter 25 and clear terminals of the registers 31b, 35b, 42b, and 47b. Input terminals 51 is connected to clear terminals of the registers 27, 32, 36, 39, 43, and 48. These registers are controlled for each block by signals supplied to the input terminals 50 and 51.

FIG. 4 shows a conventional structure of a real portion that performs the least squares method. The number of pixels m is supplied from a terminal 28 to an inverse number calculating circuit 61, a multiplying device 64, and a multiplying device 71. The inverse number calculating circuit 61 calculates the inverse number (1/m) of the number of pixels m supplied and supplies the inverse number (1/m) to a terminal 63 through a register 62. The multiplying device 64 multiplies data $\Sigma xy$ supplied from a terminal 33 by the number of pixels m and supplies output data as data $m\Sigma xy$ to a subtracting device 66 through a register 65.

Data $\Sigma x$ supplied from a terminal 37 is supplied to multiplying devices 67 and 74. Data $\Sigma y$ supplied from a terminal 44 is supplied to the multiplying device 67. The multiplying device 67 multiplies the data $\Sigma x$ and data $\Sigma y$ and supplies output data as $\Sigma x\Sigma y$ to the subtracting device 66 through a register 68. The subtracting device 66 subtracts the data $\Sigma x\Sigma y$ from the data m×xy and supplies output data as data $(m\Sigma xy - \Sigma x\Sigma y)$ to a multiplying device 79 through registers 69 and 70.

The multiplying device 71 multiplies data $\Sigma x^2$ supplied from a terminal 49 by the number of pixels m and supplies output data as data $m\Sigma x^2$ to a subtracting device 73 through a register 72. The multiplying device 74 squares the data $\Sigma x$ and supplies output data as data $(\Sigma x)^2$ to the subtracting device 73. The subtracting device 73 subtracts the data $(\Sigma x)^2$ from the data $m\Sigma x^2$ and supplies output data as data $(m\Sigma x^2-(\Sigma X)^2)$ to an inverse number calculating circuit 77 through a register 76. As described above, the inverse number calculating circuit 77 calculates the inverse number $(1/(m\Sigma x^2-(\Sigma x)^2))$ of the data $(m\Sigma x^2-(\Sigma x)^2)$ and supplies the inverse number $(1/(m\Sigma x^2-(\Sigma x)^2))$ to the multiplying device 79 through a register 78.

The multiplying device 79 multiplies the data $(m\Sigma xy-\Sigma x\Sigma y)$ by the data $(1/(m\Sigma x^2-(\Sigma x)^2)$ and supplies output data as data $((m\Sigma xy-\Sigma x\Sigma y)/(m\Sigma x^2-(\Sigma x)^2))$ to multiplying circuits 81 and 89 through a register 80. The multiplying device 81 multiplies data $\Sigma x$ supplied from a terminal 37 by the data $((m-xy\Sigma\Sigma x\Sigma y)/(m\Sigma^2-(\Sigma x)^2))$ and supplies output data as data $((m\Sigma x\Sigma xy-(\Sigma x)^2\Sigma y)/(m\Sigma x^2-(\Sigma x)^2))$ to a subtracting device 83 through a register 82.

The subtracting device 83 subtracts the data $((m\Sigma x\Sigma xy-(\Sigma x)^2\Sigma y)/(m\Sigma X^2-(\Sigma x)^2)$ from data $\Sigma y$ supplied from a terminal 44 and supplies output data as data $(m(\Sigma x^2\Sigma y-\Sigma x\Sigma xy)/(m\Sigma x^2-(\Sigma x)^2))$ to a multiplying device 85 through a register 85. The multiplying device 85 multiplies data 1/m supplied from a terminal 63 by the data $(m\Sigma x^2\Sigma y-\Sigma x\Sigma xy)/(m\Sigma x^2-(\Sigma X)^2))$ and supplies output data as data $((\Sigma x^2\Sigma y-\Sigma X\Sigma Xy)/(m\Sigma x^2-(\Sigma x)^2))$ that is an optimized minimum value MIN'. The generated minimum value MIN' is supplied to an output terminal 87 through a register 86.

A value $2^n$ predetermined corresponding to the number of quantizing bits used in the quantizing step width calculating portion 6 is supplied to a terminal 88. The multiplying device 89 multiplies the value $2^n$ supplied from the terminal 88 (where n is the number of quantizing bits) by the data $((m\Sigma xy-\Sigma x\Sigma y)/(m\Sigma x^2-(\Sigma x)^2))$ and supplies output value as data $(2n(m\Sigma xy-\Sigma x\Sigma y)/(m\Sigma x^2-(\Sigma x)^2))$ that is an optimized dynamic range DR'. The generated dynamic range DR' is supplied to an output terminal 93 through registers 90, 91, and 92. Thus, the optimized minimum value MIN' and the optimized dynamic range DR' can be obtained.

Figures 5, 5A:
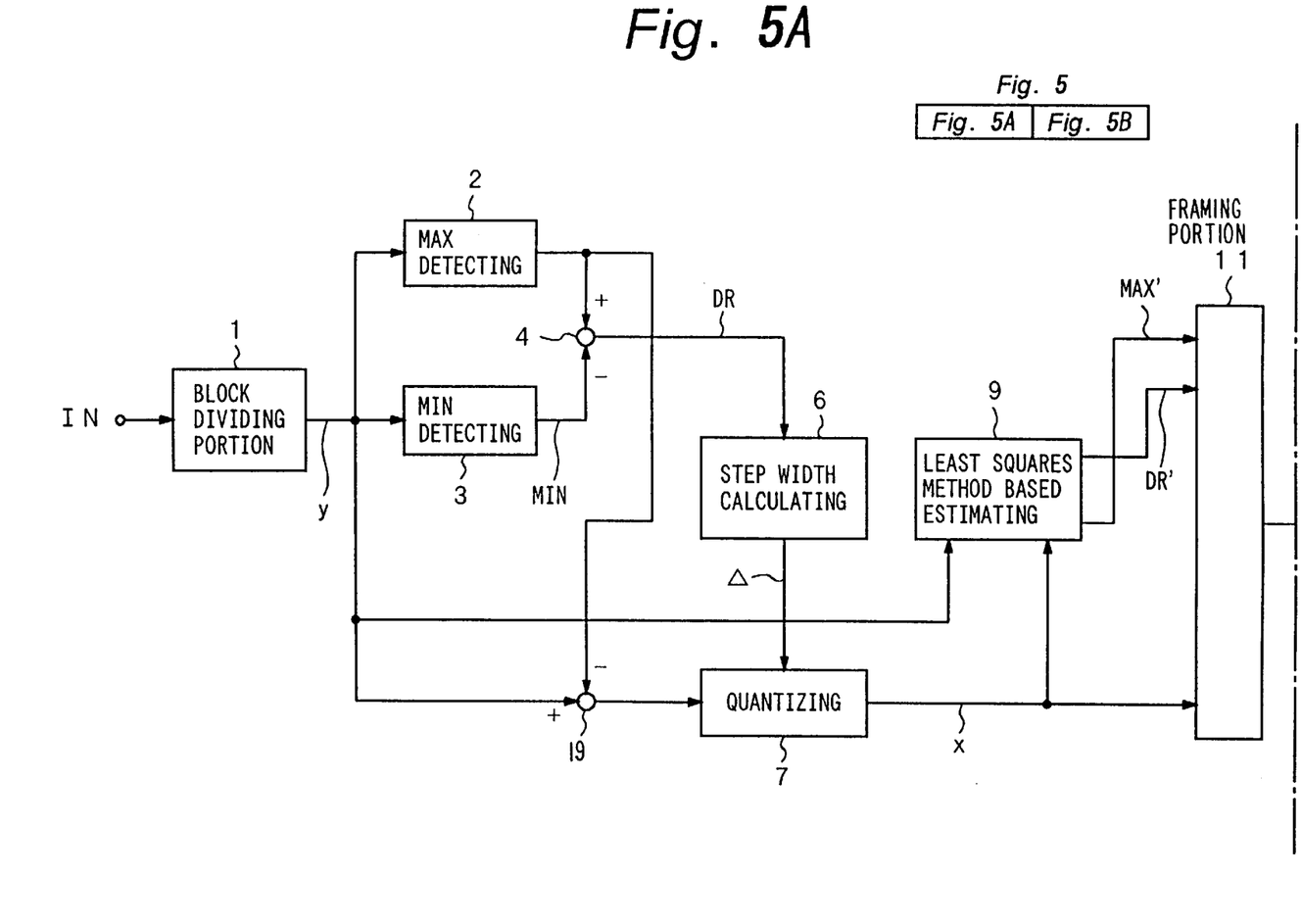
FIGS. 5A and 5B are block diagrams showing a structure of a picture encoding apparatus according to a second embodiment of the present invention.
Figure 5B:
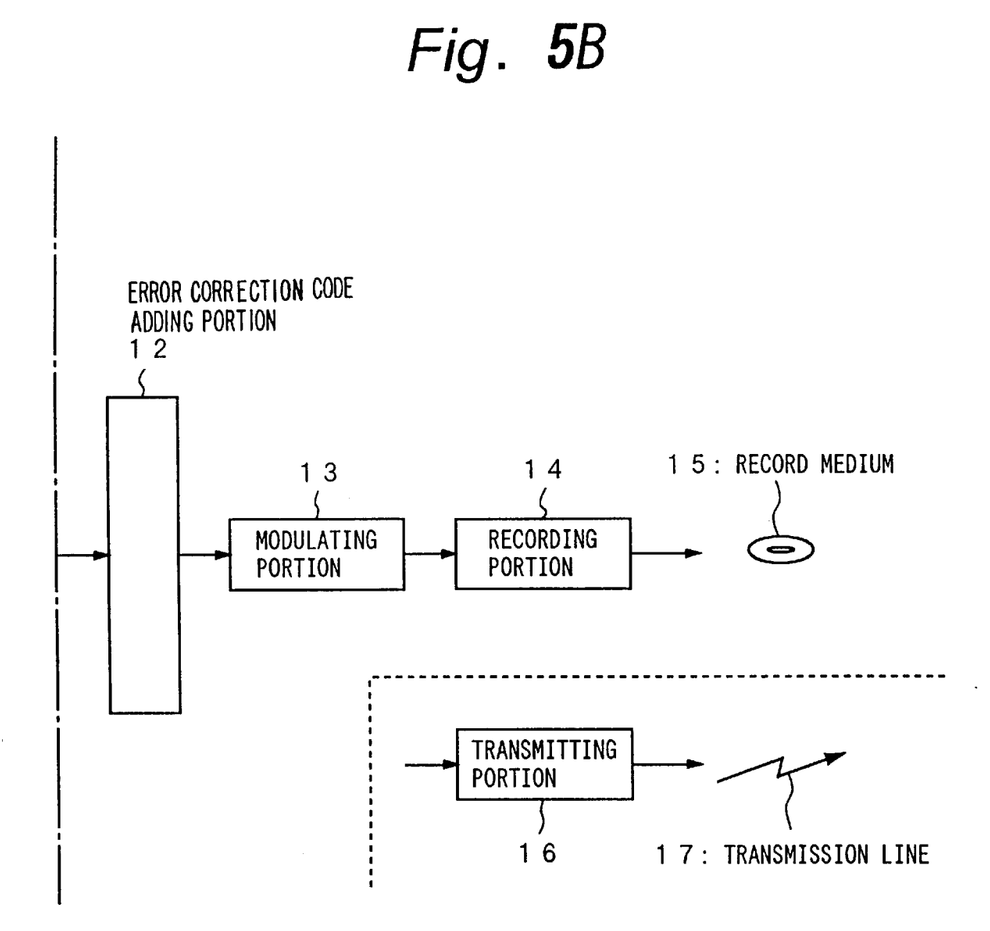

FIGS. 5A and 5B are block diagrams showing a structure of a picture encoding apparatus according to a second embodiment of the present invention. In the picture encoding apparatus according to the second embodiment, along with quantized values, an optimized maximum value MAX' and an optimized dynamic range DR' are transmitted. For simplicity, in the second embodiment, similar portions to those in the first embodiment are denoted by similar reference numerals and their description is omitted.

A subtracting portion 19 subtracts each of the input pixel values y (composed of 8 bits) of nine pixels of each block of (3×3) pixels from the maximum value MAX and normalizes the input pixel values of the 9 pixels. The normalized pixel values of the 9 pixels are supplied to a quantizing portion 7. The quantizing portion 7 supplies the quantized values (composed of 4 bits) of the 9 pixels of the block of (3×3) pixels to a least squares method based estimating portion 9 and a framing portion 11.

Input pixel values y of 9 pixels of the block of (3×3) pixels as an input pixel signal and the quantized pixel values x of the 9 pixels of the block of (3×3) pixels are supplied to the least squares method based estimating circuit 9. The least squares method based estimating circuit 9 estimates an optimized dynamic range DR' and an optimized maximum value MAX' with the input pixel values (true values) y and the quantized values y' for each block corresponding to the least squares method in such a manner that the sum of square of the error (y'—y) of the decoded values y' of the quantized values of the pixels and the true values y thereof becomes minimum. In other words, the relation expressed by the following formula (5) is satisfied between the decoded values y' of the input pixel values and the quantized values x.

$$y'=\text{MAX}-x\times \text{DR}/n \quad (5)$$

(where n is the number of quantizing bits) When the number of pixels of each block is denoted by m, the optimized dynamic range DR' can be obtained corresponding to the formula (2) with the formula (3). On the other hand, the optimized maximum value MAX' can be obtained corresponding to the following formula (6) with the formula (3).

$$\begin{aligned}\text{MAX}' &= \text{MIN}' + DR' \\ &= \left(\sum y - \Delta' \cdot \sum x\right)/m + n \cdot \Delta' \\ &= \left(\sum y + (n - \sum x)\Delta'\right)/m\end{aligned} \quad (6)$$

The optimized dynamic range DR' and the optimized maximum value MAX' are supplied to the framing portion 11. The framing portion 11 frames the quantized values x supplied from the quantizing portion 7, the optimized dynamic range DR' supplied from the least squares method based estimating portion 9, and the optimized maximum value MAX' supplied therefrom for each block.

Figures 6, 6A:
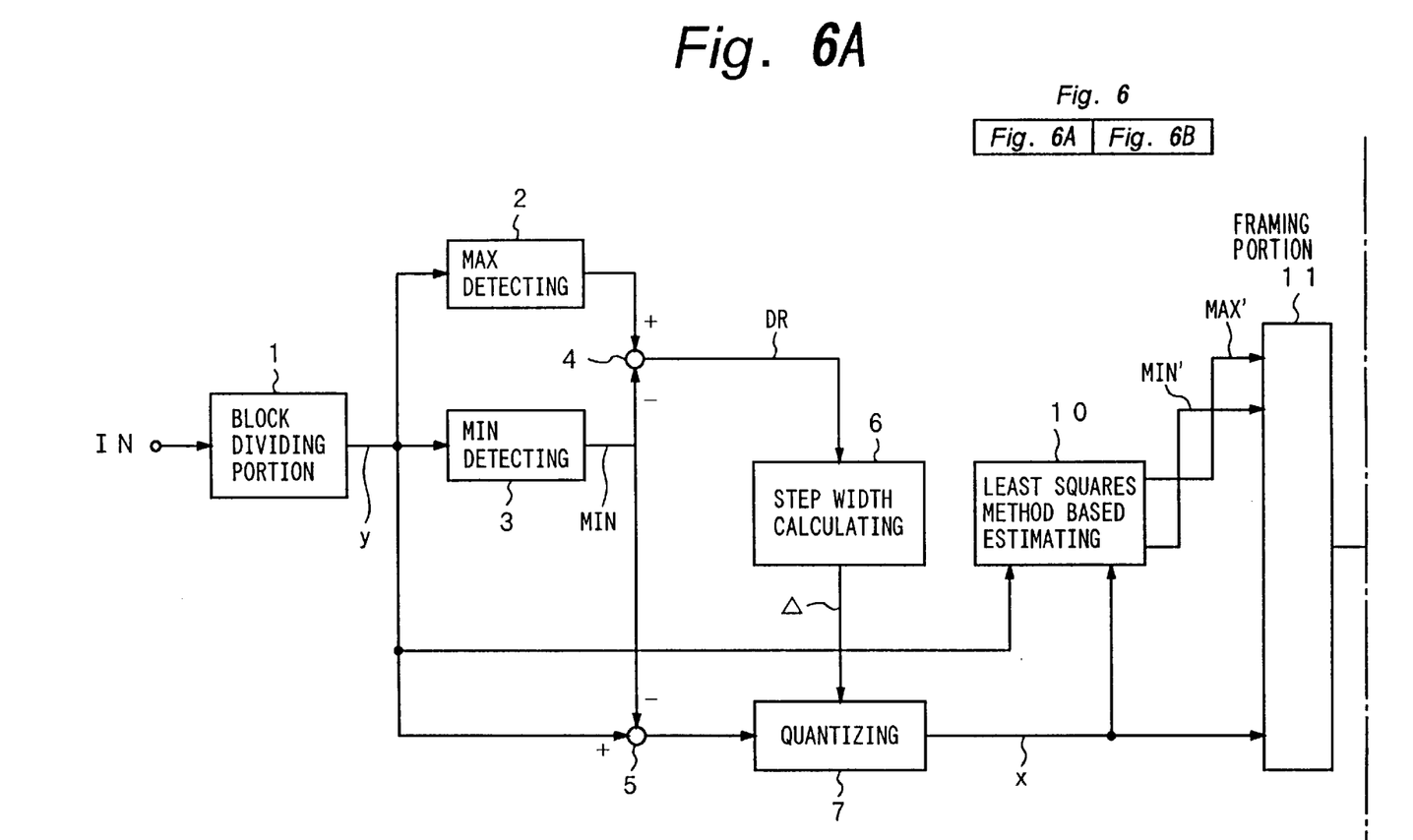
FIGS. 6A and 6B are block diagrams showing a structure of a picture encoding apparatus according to a third embodiment of the present invention.
Figure 6B:
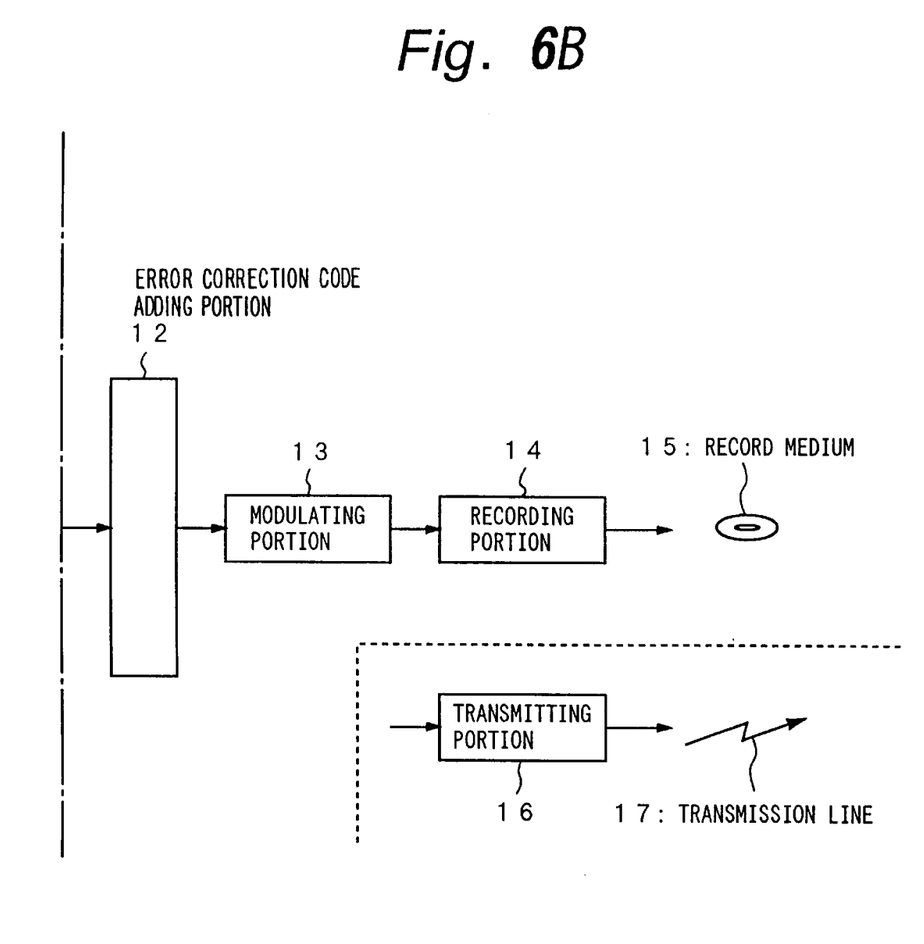

FIGS. 6A and 6B are block diagrams showing a structure of a picture encoding apparatus according to a third embodiment of the present invention. In the picture encoding apparatus according to the third embodiment, along with quantized pixel values, an optimized maximum value MAX', and an optimized minimum value MIN' are transmitted. For simplicity, in the third embodiment, similar portions to those in the first embodiment are denoted by similar reference numerals and their description will be omitted.

As with the second embodiment, a subtracting portion 5 subtracts the minimum value MIN from each of input pixel values y (composed of 8 bits) of 9 bits of each block of (3×3) pixels and normalizes the pixel values of the 9 pixels. The normalized pixel values of the 9 pixels are supplied to a quantizing portion 7.

The quantizing portion 7 supplies quantized values (composed of 4 bits) of the 9 bits of the block of (3×3) pixels to a least squares method based estimating portion 10 and a framing portion 11. Input pixel values y of 9 pixels of each block of (3×3) pixels as an input picture signal and the quantized pixel values x of the 9 pixel of each block of (3×3) pixels are supplied to the least squares method based estimating portion 10. The least squares method based estimating portion 10 estimates an optimized minimum value MIN' and an optimized maximum value MAX' with the input pixel values (true values) y and the quantized values x for each block corresponding to the least squares method in such a manner that the sum of square of the error (y'—y) of the decoded values y' of the quantized values and the true values thereof becomes minimum. In other words, the relation expressed by the following formula (7) is satisfied between the decoded values y' of the input pixel values y and the quantized values x.

$$y'=x\times(\text{MAX}-\text{MIN})/n+\text{MIN} \quad (7)$$

(where n is the number of quantizing bits)

When the number of pixels of each block is denoted by m, the optimized minimum value MIN' can be obtained corresponding to the formula (4) with the formula (3). The optimized maximum value MAX' can be obtained corresponding to the formula (6) with the formula (3). The optimized minimum value MIN' and the optimized maximum value MAX' are supplied to the framing portion 11. The framing portion 11 frames the quantized values x supplied from the quantizing portion 7, the optimized minimum value MIN' supplied from the least squares method based estimating portion 10, and the optimized maximum value MAX' supplied therefrom for each block.

Figure 7:
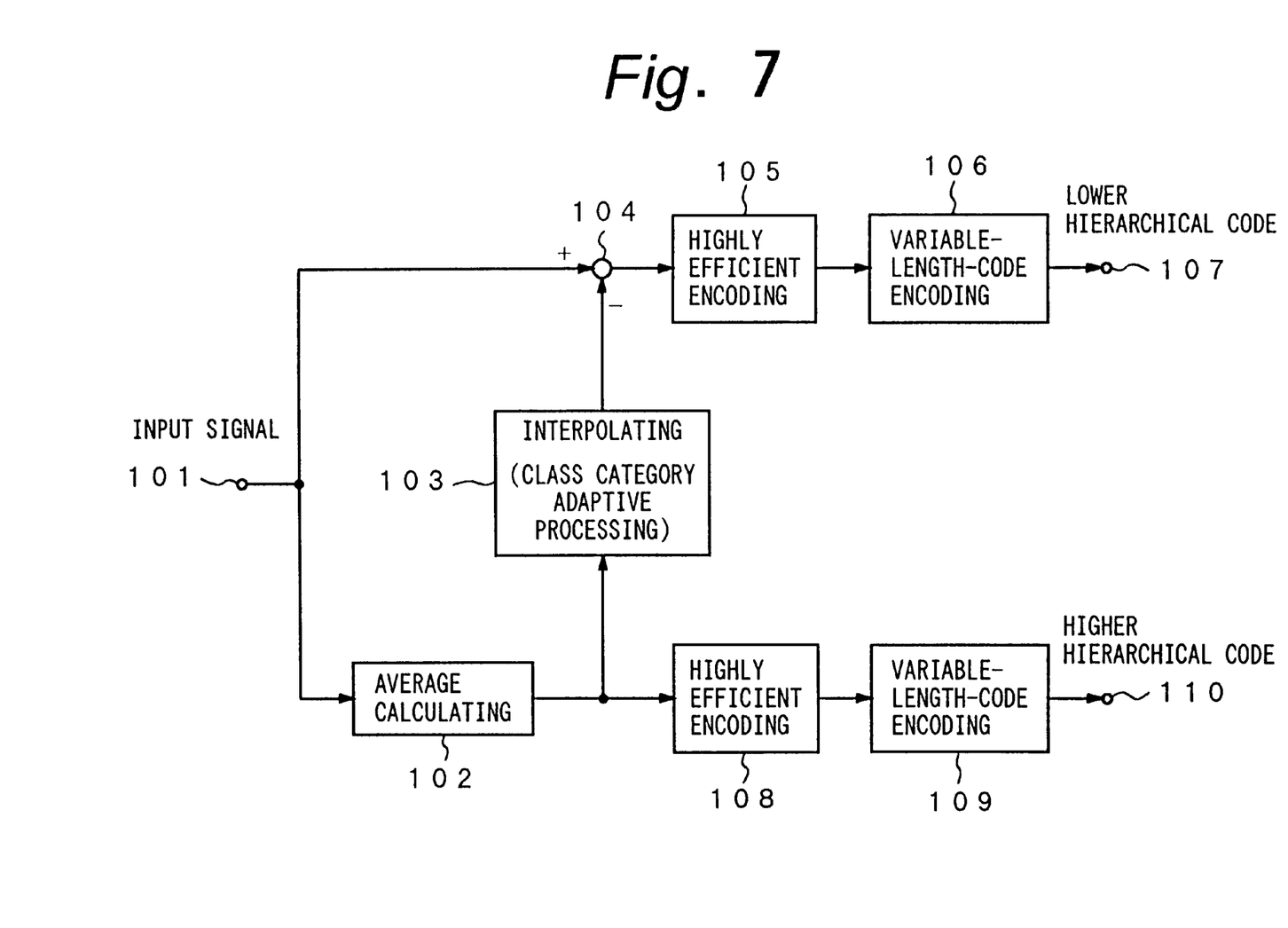
FIG. 7 is a block diagram showing a structure of a hierarchical encoding apparatus for which a picture encoding apparatus according to the present invention is applied.

FIG. 7 is a block diagram showing a structure of a hierarchical encoding apparatus for which a pixel encoding apparatus according to the present invention is applied. An input picture signal is supplied from an input terminal 101 to an average calculating portion 102 and a subtracting portion 104. The average calculating portion 102 adds 4 pixels as a block of (4×4) pixels of the input picture signal and divides the added value by 4 and outputs an average pixel value. The average pixel value is supplied to an interpolating portion 103 and a highly efficient encoding portion 108.

The interpolating portion 103 interpolates pixels (which were thinned out by the average calculating portion 102)

corresponding to for example a class category adaptive process technology and supplies the resultant pixels to a subtracting portion 104. The interpolating method corresponding to the class category adaptive process technology has been proposed by the applicant of the present patent application as for example Japanese Patent Laid-Open Publication No. 5-328185 laid open on Dec. 3, 1993. The U.S. patent application Ser. No. 08/061,730 filed on May 17, 1993 corresponds to such a Japanese patent application. It should be noted that the interpolating portion 103 may correspond to any known interpolating method other than the class category adaptive processing technology.

The subtracting portion 104 subtracts interpolated pixels from the input pixel values y and supplies the resultant difference signal to a highly efficient encoding portion 105. As with the above-described embodiments of the present invention, the highly efficient encoding portion 105 is a highly efficient encoding portion corresponding to the ADRC method that optimizes at least two parameters of a dynamic range DR, a minimum value MIN, and a maximum value MAX.

In other words, the highly efficient encoding portion 105 generates quantized values x and additional codes (for example, the optimized dynamic range DR' and the optimized minimum value MIN' in the first embodiment) and supplies the generated quantized values x and additional codes to a variable-length-code encoding portion 106. The variable-length-code encoding portion 106 performs a variable-length-code encoding process (such as Huffman-code encoding process or run-length-code encoding process) for the supplied quantized values x and the additional codes. The variable-length-code encoded data is supplied as encoded data of a lower hierarchical level to an output terminal 107.

Likewise, the averaged pixel value is supplied from the average calculating portion 102 to the highly efficient encoding portion 108. The highly efficient encoding portion 108 is a highly efficient encoding portion corresponding to the ADRC method that optimizes at least two parameters of the dynamic range DR, the minimum value MIN, and the maximum value.

In other words, the highly efficient encoding portion 108 generates the quantized values x and additional codes (for example, the optimized dynamic range DR' and the optimized minimum value MIN' in the first embodiment) and supplies the generated quantized values x and the additional codes to a variable-length-code encoding portion 109. The variable-length-code encoding portion 109 performs a variable-length-code encoding process (such as Huffman-code encoding process or run-length-code encoding process) for the supplied quantized values x and the additional codes and supplies the variable-length-code encoded data as encoded data of a higher hierarchical level to an output terminal 110.

According to the first, second, and third embodiments of the present invention, as parameters to be transmitted, at least two of the optimized dynamic range DR', the optimized minimum value MIN', and the optimized maximum value MAX are used. However, in the present invention, the parameters to be transmitted are not limited to such parameters. Instead, two parameters including at least an optimized quantizing step width $\Delta^1$ can be transmitted.

In other words, according to the present invention, the least squares method based estimating portion optimizes at least two parameters and transmits the two optimized parameters along with quantized values.

In the first and third embodiments of the present invention, the subtracting portion 5 subtracts the minimum value MIN from each of quantized values of 9 pixels. However, the present invention is not limited to such a structure. Instead, as with the second embodiment, the subtracting portion 5 may subtract each of input pixel values of 9 pixels from the maximum value MAX.

According to the second embodiment of the present invention, the subtracting portion 19 subtracts each of quantized values of 9 pixels from the maximum value MAX. However, the present invention is not limited to such a structure. As with the first embodiment, the subtracting portion 19 may subtract the minimum value from each of quantized values of 9 pixels.

Moreover, the block dividing portion according to the present invention divides an input picture signal into two-dimensional blocks each of which is composed of (3×3) pixels. However, the present invention is not limited to such a block structure. In other words, each block may be composed of other than (3×3) pixels. Alternatively, the input picture signal may be composed of three-dimensional blocks.

Furthermore, according to the above-described embodiments of the present invention, the ADRC method is used. Instead, according to the present invention, the DCT (Discrete Cosine Transform) method may be used. In this case, a DC component is optimized. Moreover, according to the present invention, the GBTC (Global Block Truncation Coding) method may be used. In this case, an average value and a standard deviation may be optimized.

In addition, according to the above-described embodiments of the present invention, the encoding apparatus encodes a digital picture signal. However, the present invention is not limited to such apparatus. Instead, the present invention may be applied for an encoding apparatus that encodes data such as a digital audio signal.

According to the present invention, on the encoding side, parameters for obtaining quantized values are optimized corresponding to the least squares method in such a manner that a decoded error between original signal values and restored values becomes minimum. Thus, according to the present invention, the error between the restored values and the original signal values is decreased on the decoding side.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A picture encoding apparatus for encoding an input digital picture signal in such a manner that the amount of generated data of the input digital picture signal is reduced, comprising:

a block dividing portion for dividing the input digital picture signal into blocks, each of which is composed of a plurality of pixels;

an encoding portion for encoding the pixels of each of the blocks and generating encoded data and at least one of a dynamic range and a minimum value associated with each of the blocks; and an optimizing portion for optimizing the at least one of the dynamic range and the minimum value generated for each of the blocks in such a manner that the sum of square of an decoded error of the encoded data becomes minimum.

2. A picture encoding method for encoding an input digital picture signal in such a manner that the amount of generated data of the input digital picture signal is reduced, comprising the steps of:

dividing the input digital picture signal into blocks, each of which is composed of a plurality of pixels;

encoding the pixels of each of the blocks and generating encoded data and at least one of a dynamic range and a minimum value; and optimizing the at least one of the dynamic range and the minimum value generated for each of the blocks in such a manner that the sum of square of an decoded error of the encoded data becomes minimum.

3. A picture encoding and transmitting method for encoding and transmitting an input digital picture signal in such a manner that the amount of generated data of the input digital picture signal is reduced, comprising the steps of:

dividing the input digital picture signal into blocks, each of which is composed of a plurality of pixels;

encoding the pixels of each of the blocks and generating encoded data and at least one of a dynamic range and a minimum value;

optimizing the at least one of the dynamic range and the minimum value generated for each of the blocks in such a manner that the sum of square os an decoded error of the encoded data becomes minimum; and transmitting the encoded data the optimized parameter for each of the blocks.

* * * * *